(12) United States Patent
Nguyen et al.

(10) Patent No.: US 12,030,231 B2
(45) Date of Patent: Jul. 9, 2024

(54) INJECTION MOLDING APPARATUS WITH A THERMAL BRIDGE

(71) Applicant: Milacron LLC, Cincinnati, OH (US)

(72) Inventors: Thanh Huu Nguyen, North Billerica, MA (US); Cheryl Ann Sayer, Lowell, MA (US)

(73) Assignee: Milacron LLC, Cincinnati, OH (US)

( * ) Notice: Subject to any disclaimer, the term of this patent is extended or adjusted under 35 U.S.C. 154(b) by 285 days.

(21) Appl. No.: 17/612,729

(22) PCT Filed: Oct. 6, 2020

(86) PCT No.: PCT/US2020/054339
§ 371 (c)(1),
(2) Date: Nov. 19, 2021

(87) PCT Pub. No.: WO2021/071797
PCT Pub. Date: Apr. 15, 2021

(65) Prior Publication Data
US 2022/0234269 A1    Jul. 28, 2022

Related U.S. Application Data

(60) Provisional application No. 62/912,158, filed on Oct. 8, 2019.

(51) Int. Cl.
*B29C 45/28*   (2006.01)
*B29C 45/27*   (2006.01)

(52) U.S. Cl.
CPC ...... *B29C 45/2806* (2013.01); *B29C 45/2725* (2013.01); *B29C 45/2737* (2013.01); *B29C 2045/2762* (2013.01); *B29C 45/278* (2013.01)

(58) Field of Classification Search
CPC .............. B29C 45/278; B29C 45/2708; B29C 2045/2762
See application file for complete search history.

(56) References Cited

U.S. PATENT DOCUMENTS

| 4,433,969 A | 2/1984 | Gellert |
| 5,090,890 A | 2/1992 | Morita |

(Continued)

FOREIGN PATENT DOCUMENTS

| CN | 205416236 U | 8/2016 |
| DE | 3616275 A1 | 11/1987 |

(Continued)

OTHER PUBLICATIONS

International Search Report (ISA/210) for International Patent Application No. PCT/US2020/054339 issued/mailed by the US Patent Office dated Jan. 5, 2021.

(Continued)

*Primary Examiner* — Nahida Sultana
*Assistant Examiner* — Virak Nguon
(74) *Attorney, Agent, or Firm* — Dinsmore & Shohl LLP (57) ABSTRACT

An injection molding apparatus and hot runner system are disclosed. The injection molding apparatus includes a plurality of mold plates in which the hot runner system is received. A manifold receives molding material and has a manifold channel that extends between an inlet and an outlet. A nozzle delivers moldable material to a mold cavity. The nozzle has a nozzle channel in fluid communication between the manifold channel and the mold cavity. A valve pin seal is located at the upstream end of the nozzle, and a valve pin that is connected to an actuator extends through the manifold and nozzle is slidably received in the valve pin seal. The hot runner system further includes a thermal bridge that is in conductive thermal communication with the valve pin seal and a cooled one of the plurality of mold plates.

17 Claims, 11 Drawing Sheets

(56) References Cited

U.S. PATENT DOCUMENTS

| | | |
|---|---|---|
| 5,378,138 A | 1/1995 | Onuma et al. |
| 6,343,925 B1 | 2/2002 | Jenko |
| 6,440,350 B1 | 8/2002 | Gellert et al. |
| 6,793,481 B2 | 9/2004 | Murayama et al. |
| 7,407,380 B2 | 8/2008 | Tabassi |
| 7,731,489 B2 | 6/2010 | Fairy |
| 7,862,329 B2 | 1/2011 | Martino et al. |
| 2008/0279979 A1 | 11/2008 | Fairy et al. |
| 2009/0142440 A1 | 6/2009 | Babin et al. |
| 2011/0027410 A1 | 2/2011 | Mohammed et al. |
| 2011/0129561 A1* | 6/2011 | Adas .............. B29C 45/2806 425/564 |
| 2017/0291337 A1 | 10/2017 | Günther et al. |
| 2018/0021992 A1 | 1/2018 | Moss |
| 2020/0130145 A1 | 4/2020 | Niklas et al. |
| 2020/0290252 A1* | 9/2020 | Bosonetto .......... B29C 45/2725 |
| 2021/0086423 A1* | 3/2021 | Tabassi ............... B29C 45/231 |

FOREIGN PATENT DOCUMENTS

| | | | |
|---|---|---|---|
| JP | 200450199 A | | 2/2004 |
| JP | 2004050199 A | * | 2/2004 |
| WO | 2019008616 A1 | | 1/2019 |

OTHER PUBLICATIONS

Written Opinion of the International Searching Authority (ISA/237) for International Patent Application No. PCT/US2020/054339 issued/mailed by the US Patent Office dated Jan. 5, 2021.

* cited by examiner

INJECTION MOLDING APPARATUS WITH A THERMAL BRIDGE

CROSS REFERENCE TO RELATED APPLICATION

The present application claims the benefit of prior U.S. Appl. No. 62/912,158, filed Oct. 8, 2019, which is incorporated by reference herein in its entirety.

TECHNICAL FIELD

The present invention relates to an injection molding apparatus, and in particular, to an injection molding apparatus with a thermal bridge.

BACKGROUND

Egress of molding material and/or molding material byproducts from a hot runner channel through the interface between a valve pin and a valve pin seal is undesirable.

SUMMARY

Embodiments hereof are directed to a hot runner system. A manifold receives molding material from a source and has a manifold channel that extends between a manifold inlet and a manifold outlet. A nozzle delivers molding material to a mold cavity. The nozzle has a nozzle channel in fluid communication between the manifold channel and the mold cavity. A valve pin seal is located at an upstream end of the nozzle. A valve pin is slidably received in the valve pin seal. The valve pin extends through the manifold and the nozzle and is connected to an actuator for translating the valve pin between an open position and a closed position. The hot runner system further includes a thermal bridge in conductive thermal communication with the valve pin seal and a cooled mold plate.

Embodiments hereof are directed to an injection molding apparatus having a plurality of mold plates that define an enclosure in which a hot runner system is received. A manifold receives molding material from a source and has a manifold channel that extends between a manifold inlet and a manifold outlet. A nozzle delivers molding material to a mold cavity. The nozzle has a nozzle channel in fluid communication between the manifold channel and the mold cavity. A valve pin seal is located at an upstream end of the nozzle. A valve pin is slidably received in the valve pin seal. The valve pin extends through the manifold and the nozzle and is connected to an actuator for translating the valve pin between open and closed positions. The hot runner system further includes a thermal bridge. In operation the thermal bridge is in conductive thermal communication with the valve pin seal and a cooled one of the plurality of mold plates.

DETAILED DESCRIPTION

In the following description, "downstream" is used with reference to the general direction of molding material flow from an injection unit to a mold cavity of an injection molding system and to the order of components, or features thereof, through which the molding material flows from an inlet of the injection molding system to the mold cavity. "Upstream" is used with reference to the opposite direction. As used herein, the phrase, "conductive thermal communication" refers to components forming a physical pathway, through which heat can travel. Further, there is no intention to be bound by any expressed or implied theory presented in the preceding technical field, background, summary or the following detailed description.

Figure 1:
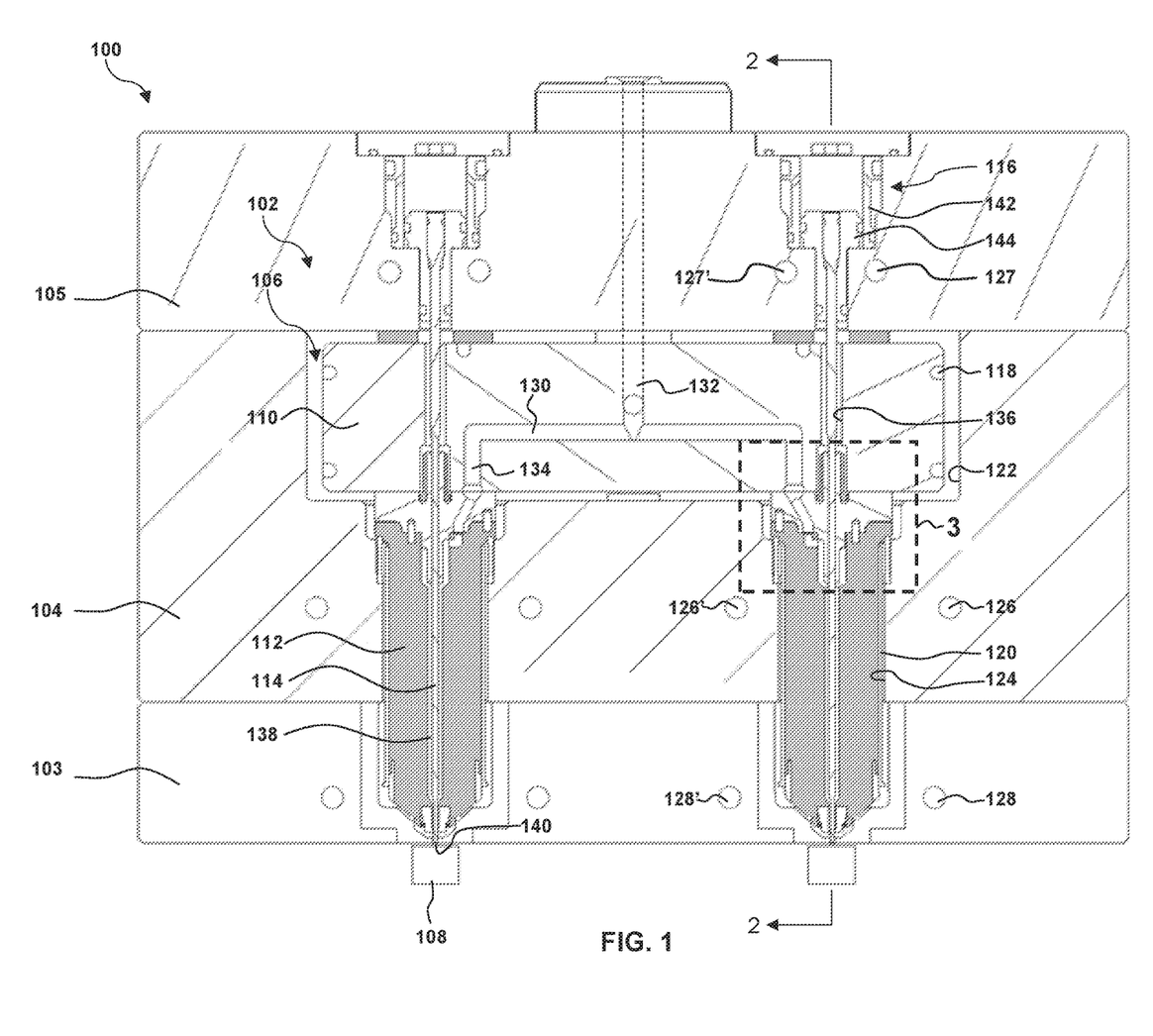
FIG. 1 is a sectional view of an injection molding apparatus having a hot runner system with a thermal bridge in accordance with an embodiment of the present disclosure.
Figure 2:
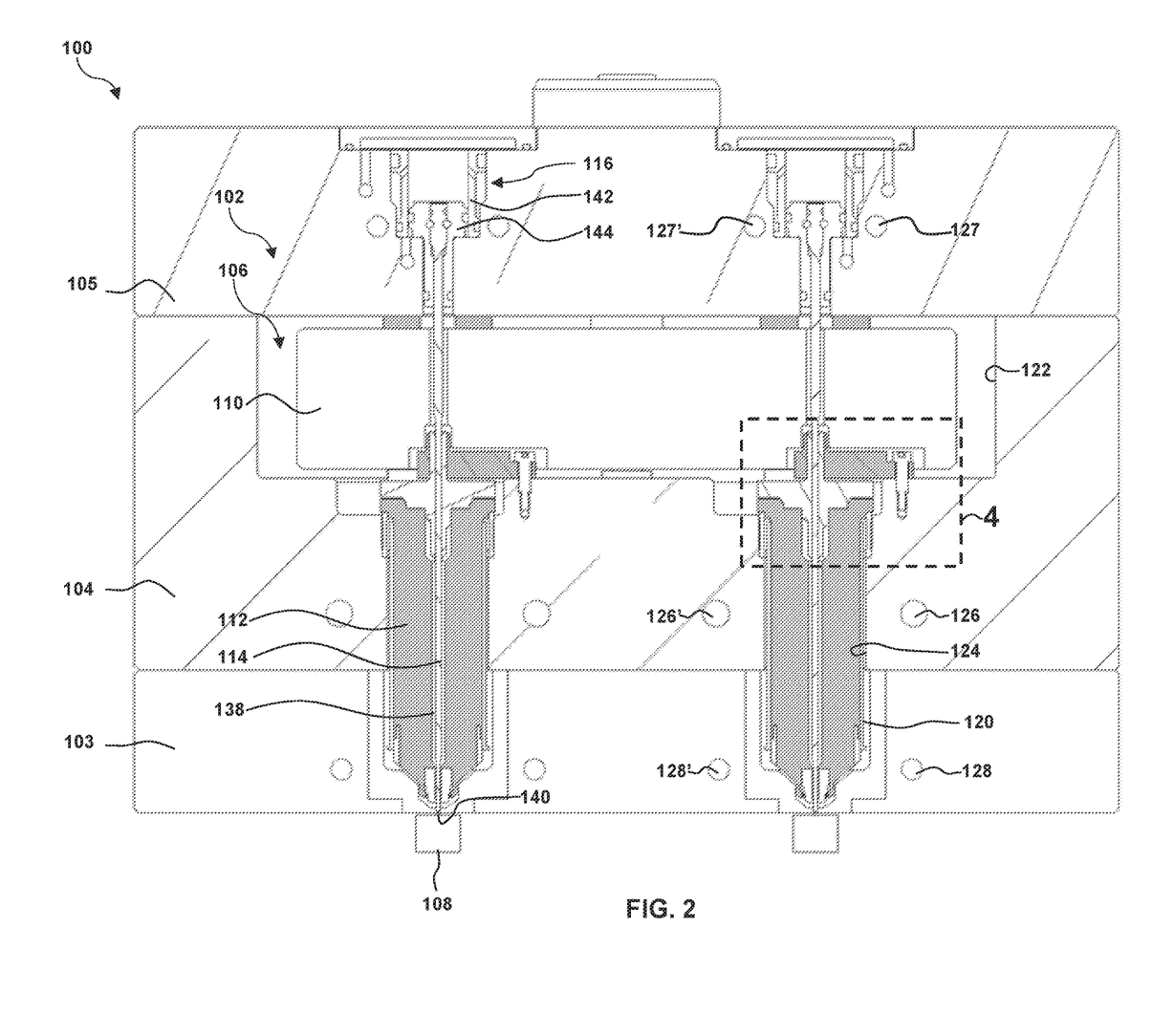
FIG. 2 is a sectional view of the injection molding apparatus taken along line 2-2 of FIG. 1.

Referring now to FIGS. 1 and 2 in which FIG. 1 is a sectional view of an injection molding apparatus 100 having a hot runner system 102 in accordance with an embodiment of the present disclosure, and FIG. 2 is a sectional view of injection molding apparatus 100 taken along line 2-2 of FIG. 1. Injection molding apparatus 100 includes a plurality of mold plates which form an enclosure 106 in which hot runner system 102 is received. As shown, injection molding apparatus 100 includes a first mold plate 103, a second mold plate 104, and a third mold plate 105. Mold plates 103, 104, 105 are held together by fasteners (not shown) and typically include additional fastening/aligning components such as dowels and the like (not shown). While injection molding apparatus 100 is shown having three mold plates 103, 104, 105, injection molding apparatus 100 can include other than three mold plates.

Hot runner system 102 delivers molding material received from a source, typically an injection molding machine (not shown), to a mold cavity 108 (shown schematically in FIGS. 1 and 2) which defines the shape of a molded article that is formed in injection molding apparatus 100. Hot runner system 102 includes a manifold 110, a nozzle 112, a valve pin 114, and an actuator 116, for example, a fluid driven actuator as shown in FIGS. 1 and 2. Manifold 110 and nozzle 112 include respective manifold and nozzle heaters 118, 120 which, in operation, maintain manifold 110 and nozzle 112 at a suitable processing temperature. Enclosure 106 includes a pocket 122 in second mold plate 104 that surrounds manifold 110 and is enclosed by third mold plate 105, and a well 124 that surrounds nozzle 112. Mold plates 103, 104, 105 include cooling channels, such as cooling channels 126, 126' in second mold plate 104, cooling channels 128, 128' in first mold plate 103, and cooling channels 127, 127' in third mold plate 105. Cooling fluid is circulated through cooling channels 126, 126', 127, 127',128, 128' to maintain first, second and third mold plates 103, 104, 105 at a suitable molding temperature which is less than the operational temperature of hot runner system 102.

Referring to FIG. 1, manifold 110 includes a manifold channel 130 that extends between a manifold inlet 132 (shown in phantom) and a manifold outlet 134. In operation, manifold 110 receives molding material from a source, via manifold inlet 132, and delivers molding material to nozzle 112 via manifold outlet 134. Manifold 110 further includes a valve pin passageway 136 through which valve pin 114 extends. Nozzle 112 delivers molding material to mold cavity 108. Nozzle 112 includes a nozzle channel 138 in fluid communication between manifold channel 130 and mold cavity 108. Valve pin 114 extends across manifold 110, through valve pin passageway 136, and through nozzle channel 138. Referring to FIG. 2, at its upstream end, valve pin 114 is coupled to actuator 116 which translates valve pin 114 between a closed position and an open position. In its closed position, valve pin 114 is positioned to block a mold gate 140 to prevent moldable material from entering mold cavity 108; in its open position, valve pin 114 is separated from mold gate 140 to allow molding material to be injected into mold cavity 108. In some applications, actuator 116 is configured to move valve pin 114 to an intermediate position that is between its open position and its closed position. Actuator 116 includes a stationary part 142 secured to third mold plate 105 and a movable part 144 to which valve pin 114 is coupled to be movable therewith. As shown herein, actuator 116 is a fluid driven actuator by way of example and not limitation.

Figure 3:
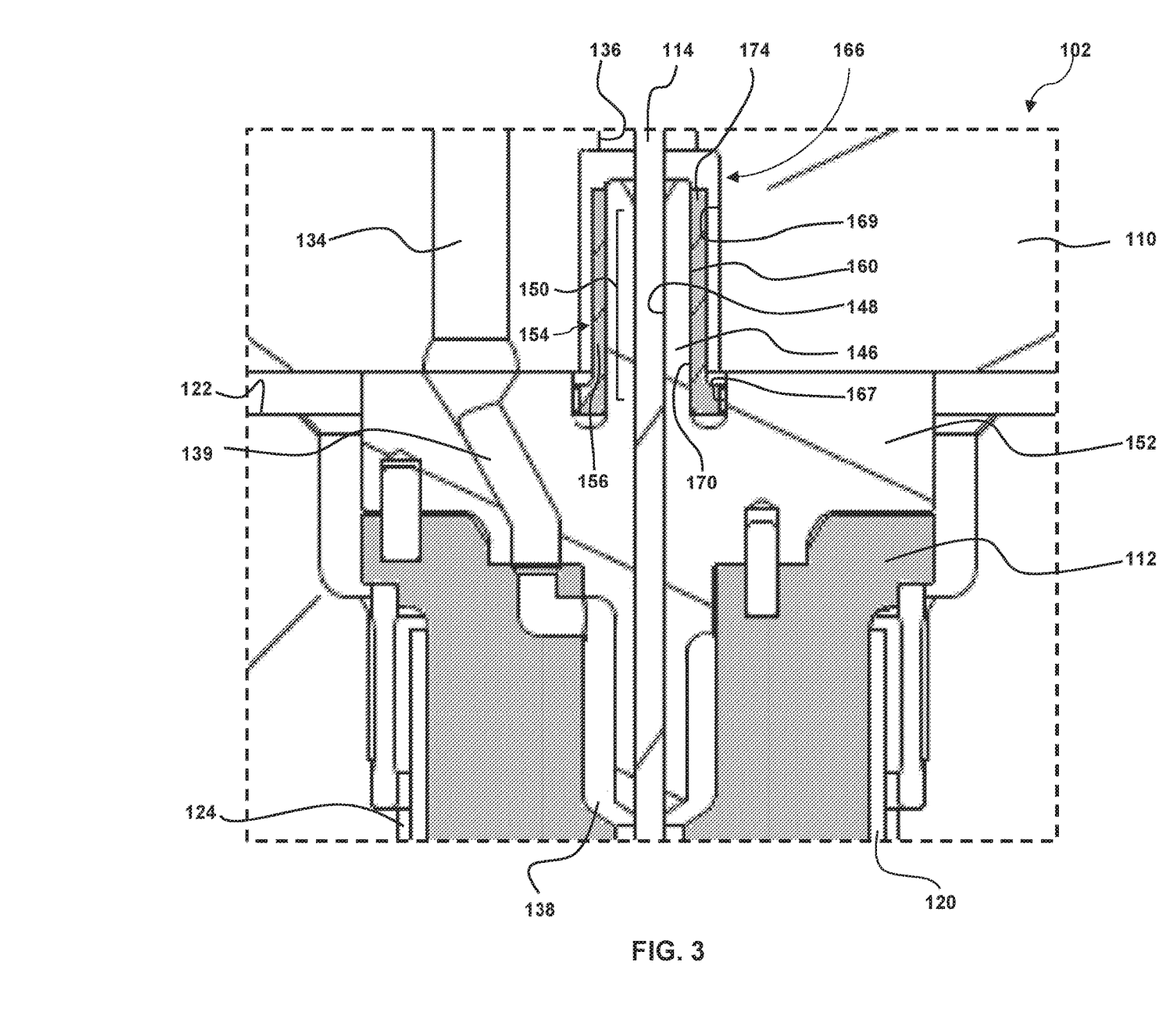
FIG. 3 is an enlarged view of a portion 3 of FIG. 1.
Figure 4:
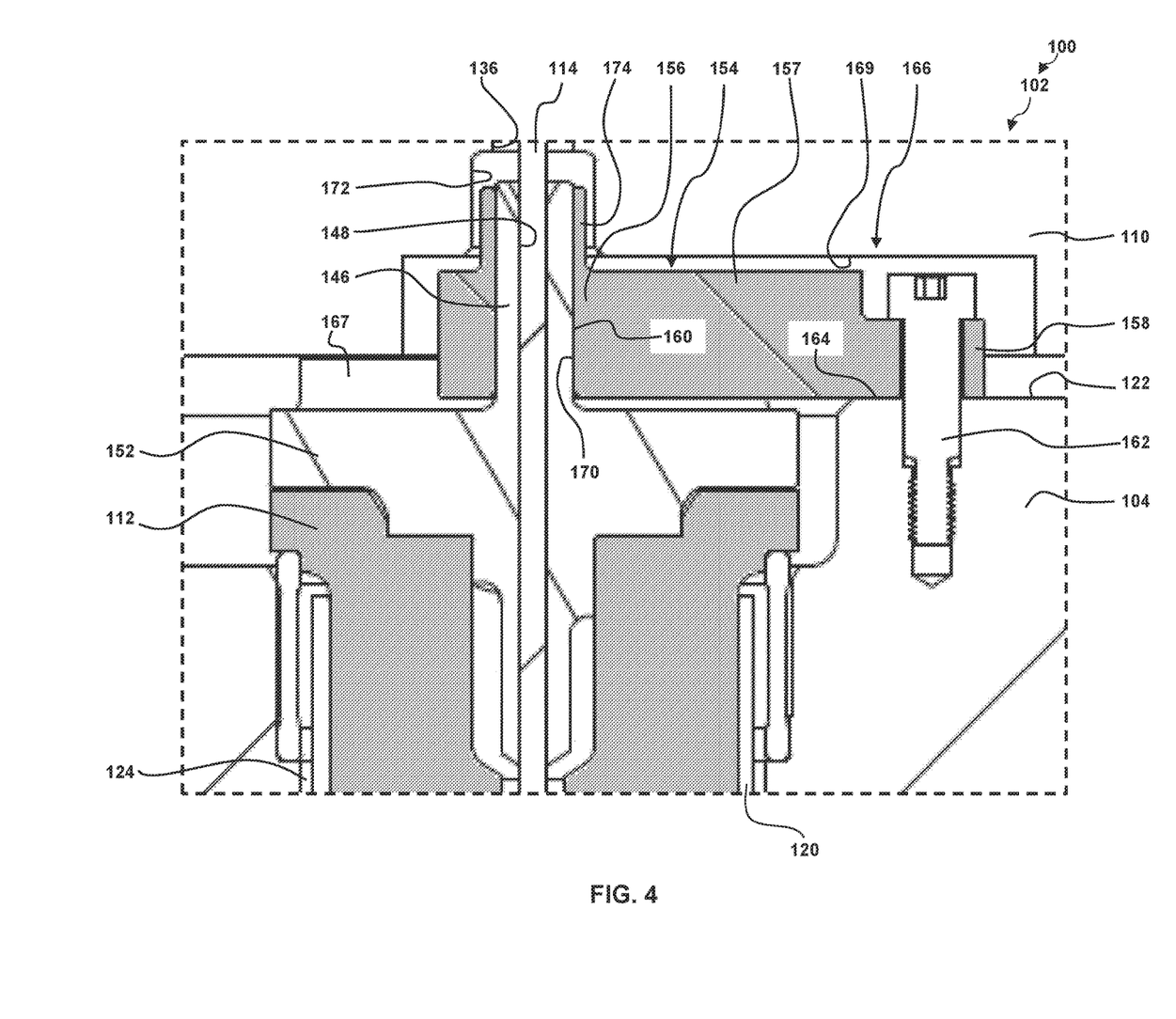
FIG. 4 is an enlarged view of a portion 4 of FIG. 2.

Referring now to FIGS. 3 and 4, in which FIG. 3 is an enlarged view of a portion 3 of FIG. 1 and FIG. 4 is an enlarged view of a portion 4 of FIG. 2. An upstream end of nozzle 112 includes a valve pin seal 146. Valve pin seal 146 has a valve pin bore 148 extending therethrough in which valve pin 114 is received. At least a portion of valve pin bore 148 is sized to slidably mate with valve pin 114 to form a sealing interface 150, as shown in FIG. 3. To reduce or prevent migration of molding material out of nozzle channel 138 via sealing interface 150, valve pin bore 148 and valve pin 114 are closely sized. In the current embodiment, valve pin seal 146 is a portion of a bushing component 152 that is located at the upstream end of nozzle 112 and (as shown in FIG. 3) bushing component 152 defines an upstream portion 139 of nozzle channel 138.

In accordance with embodiments hereof, hot runner system 102 includes a thermal bridge 154 that is in conductive thermal communication with valve pin seal 146 and is in conductive thermal communication with second mold plate 104 (see FIG. 4), which is cooler than valve pin seal 146. Thermal bridge 154 longitudinally overlaps valve pin seal 146 to transfer heat away from valve pin seal 146 to second mold plate 104. In such a configuration, valve pin seal 146 is disposed between valve pin 114 and thermal bridge 154.

Figure 5:
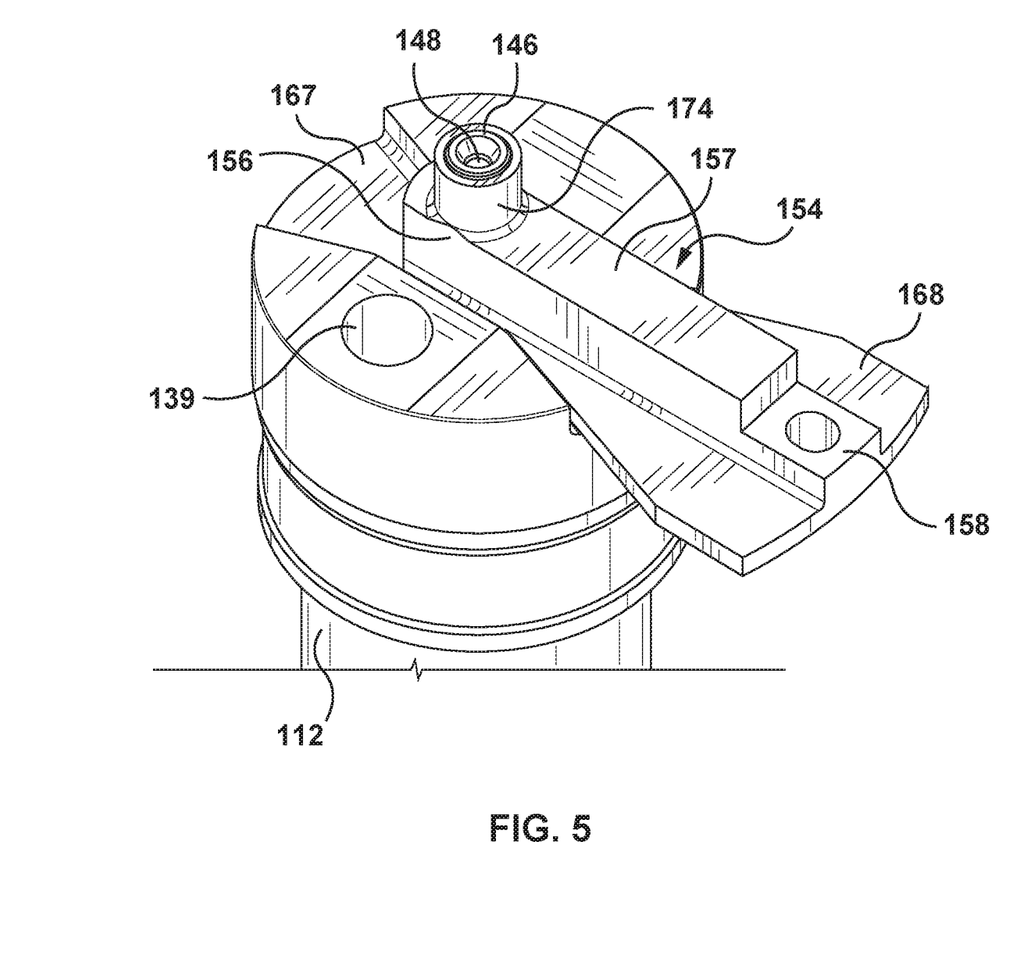
FIG. 5 is a perspective view of the upstream end of a nozzle and thermal bridge shown removed from the injection molding apparatus of FIG. 1.

Continuing with FIG. 4 and referring to FIG. 5 which is a perspective view of the upstream end of nozzle 112 and thermal bridge 154 shown removed from injection molding apparatus 100 of FIG. 1. With reference to valve pin seal 146, thermal bridge 154 includes a proximal portion 156 and a distal portion 158 that is laterally spaced apart from proximal portion 156 by a medial portion 157. When thermal bridge 154 is installed in injection molding apparatus 100, distal portion 158 is spaced apart, across well 124, from proximal portion 156. Proximal portion 156 is in conductive thermal communication with valve pin seal 146. A proximal heat transfer interface 160 (see FIG. 4) is defined between valve pin seal 146 and proximal portion 156. Distal portion 158 is in conductive thermal communication with second mold plate 104. Thermal bridge 154 is seated against second mold plate 104 at distal portion 158, for example, against a surface of pocket 122, and is secured in place by, for example a fastener 162, such as a shoulder bolt as is shown in FIG. 4, which both secures and locates thermal bridge 154. A distal heat transfer interface 164 is defined between distal portion 158 and second mold plate 104. As shown, distal heat transfer interface 164 is, for example, a planar abutting connection between distal portion 158 and second mold plate 104. In an embodiment of the present disclosure, the surface area of distal heat transfer interface 164 is equal to or greater than the surface area of proximal heat transfer interface 160 which improves heat transfer from valve pin seal 146 to second mold plate 104 in comparison to a configuration in which the surface area of distal heat transfer interface 164 is less than the surface area of proximal heat transfer interface 160.

In operation, heat from nozzle heater 120 is transferred to valve pin seal 146 which can increase the size of valve pin bore 148 relative to the size of valve pin 114. To mitigate this, thermal bridge 154 provides a pathway through which heat can be evacuated away from valve pin seal 146, which can reduce the impact of heat from nozzle heater 120 on the size of valve pin bore 148. In addition, removing heat from valve pin seal 146 can have the effect of increasing the viscosity of or solidifying molding material, and/or molding material byproducts, that may migrate between valve pin 114 and valve pin bore 148 which reduces the likelihood of or prevents molding material from egressing hot runner system 102 from between valve pin 114 and valve pin bore 148.

To encourage heat transfer from valve pin seal 146 to second mold plate 104, which, in operation, is cooler than valve pin seal 146, thermal bridge 154 is made from a material that is more thermally conductive than the material from which valve pin seal 146 is made. Non-limiting examples of such a material for thermal bridge 154 include a copper alloy such as Beryllium Copper or a Beryllium-free Copper alloy such as AMPCO 940.

Continuing with FIGS. 3 and 4, at least a portion of the length of thermal bridge 154 is surrounded by a walled passageway 166. Walled passageway 166 can be formed in a variety of ways. For example, as shown in FIGS. 3 and 4, walled passageway 166 includes a slot 167 in the upstream end of nozzle 112 (also shown in FIG. 5), that extends laterally outward from valve pin seal 146 and a second slot 169 in the downstream side of manifold 110 that extends laterally outward from valve pin passageway 136. Walled passageway 166 is sized to be spaced apart from thermal bridge 154 by an air gap which thermally insulates thermal bridge 154 from manifold 110 and nozzle 112, other than the conductive thermal communication between thermal bridge 154 and valve pin seal 146. This arrangement promotes an efficient heat transfer pathway from valve pin seal 146 to second mold plate 104 while also maintaining effective heat transfer between manifold 110 and nozzle 112 at the interface between manifold outlet 134 and nozzle channel 138.

As shown in FIG. 5, distal portion 158 optionally includes a base portion 168 which is an enlargement of at least a portion of distal portion 158 through which thermal bridge 154 is in conductive thermal communication with second mold plate 104. Base portion 168 increases the surface area of distal heat transfer interface 164 which can improve the effectiveness of thermal bridge 154 in comparison to a version of thermal bridge 154 without base portion 168.

Continuing with FIGS. 3 and 4, in the current embodiment valve pin seal 146 is a tubular shaped structure in which valve pin 114 is slidably received. Proximal portion 156 of thermal bridge 154 has an opening 170 that extends axially therethrough and surrounds valve pin seal 146. Thermal bridge 154 is in conductive thermal communication with the outer circumference of valve pin seal 146 through opening 170. This engagement between valve pin seal 146 and proximal portion 156 creates a longitudinally extending annular shaped proximal heat transfer interface 160 between thermal bridge 154 and valve pin seal 146. Surrounding valve pin seal 146 with thermal bridge 154 allows heat to be transferred circumferentially away from valve pin seal 146. In some applications this configuration may be beneficial for evenly affecting the temperature around the circumference of valve pin seal 146. In some applications it may be enough for thermal bridge 154 to partially surround valve pin seal 146, for example in embodiments in which it might be beneficial to draw heat away from a specific portion of valve pin seal 146.

Valve pin seal 146, including at least a portion of sealing interface 150 (see FIG. 3), optionally projects beyond the upstream end of nozzle 112 and into valve pin passageway 136 in manifold 110. This configuration increases the distance between sealing interface 150 and nozzle heater 120, which may lessen the impact of nozzle heater 120 on the size of valve pin bore 148. To accommodate valve pin seal 146, valve pin passageway 136 includes an enlarged portion 172 (see FIG. 4) which is sized to prevent contact and thus heat transfer between manifold 110 and valve pin seal 146. In an alternative embodiment (not shown) valve pin passageway 136 is sized to accommodate valve pin seal 146 without having an enlarged portion.

Referring to FIG. 4, thermal bridge 154 optionally includes a sleeve 174 in which valve pin seal 146 is received. Sleeve 174 projects axially from proximal portion 156. Opening 170 extends through sleeve 174 and surrounds valve pin seal 146. To accommodate sleeve 174, enlarged portion 172 of valve pin passageway 136 is sized to receive sleeve 174 and prevent contact between manifold 110 and sleeve 174 which could diminish the effectiveness of thermal bridge 154. In an alternative embodiment (not shown) valve pin passageway 136 is sized to accommodate valve pin seal 146 and sleeve 174 without having an enlarged portion.

Figure 6:
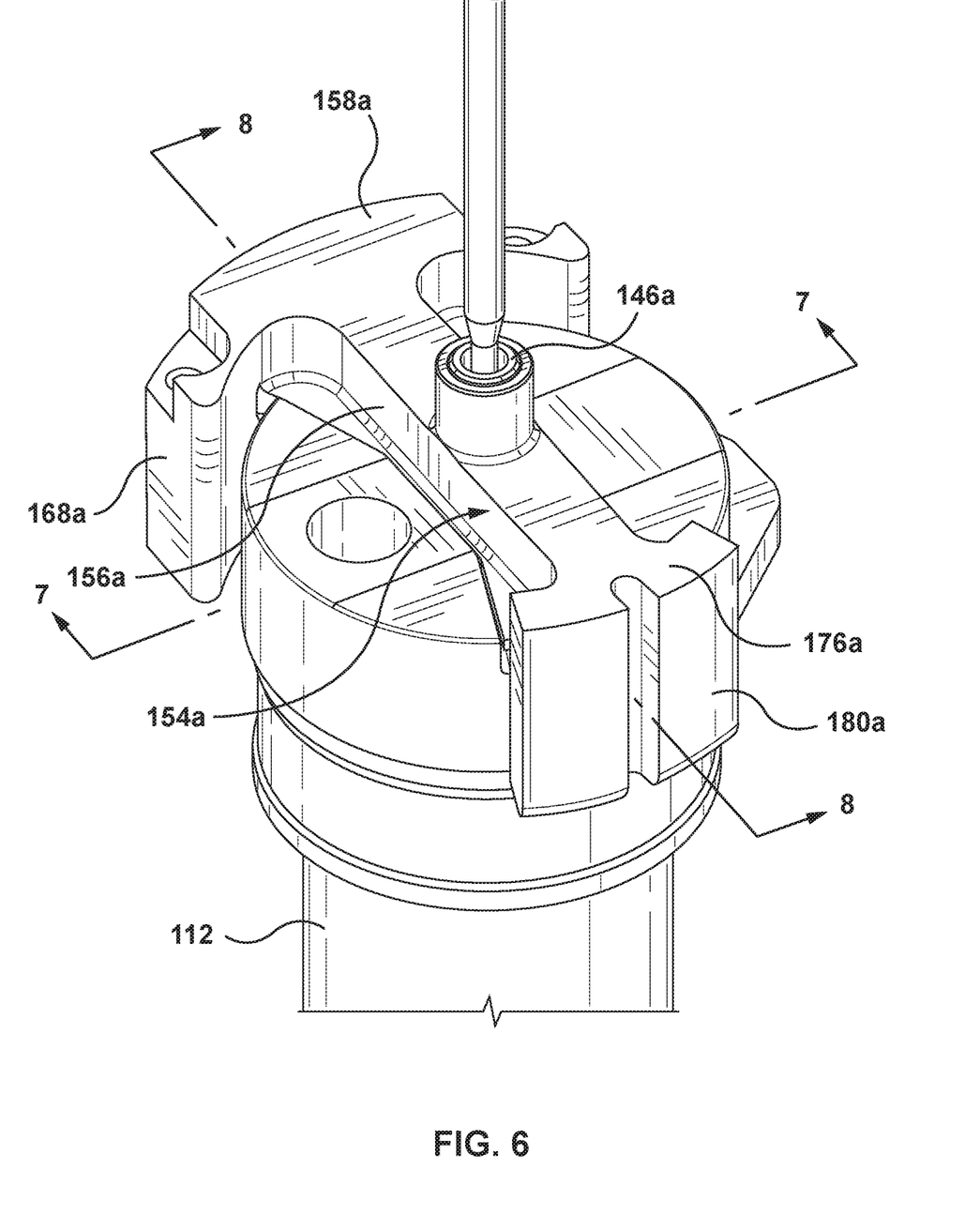
FIG. 6 is a perspective view of the upstream end of a nozzle and a thermal bridge in accordance with another embodiment of the present disclosure.
Figure 7:
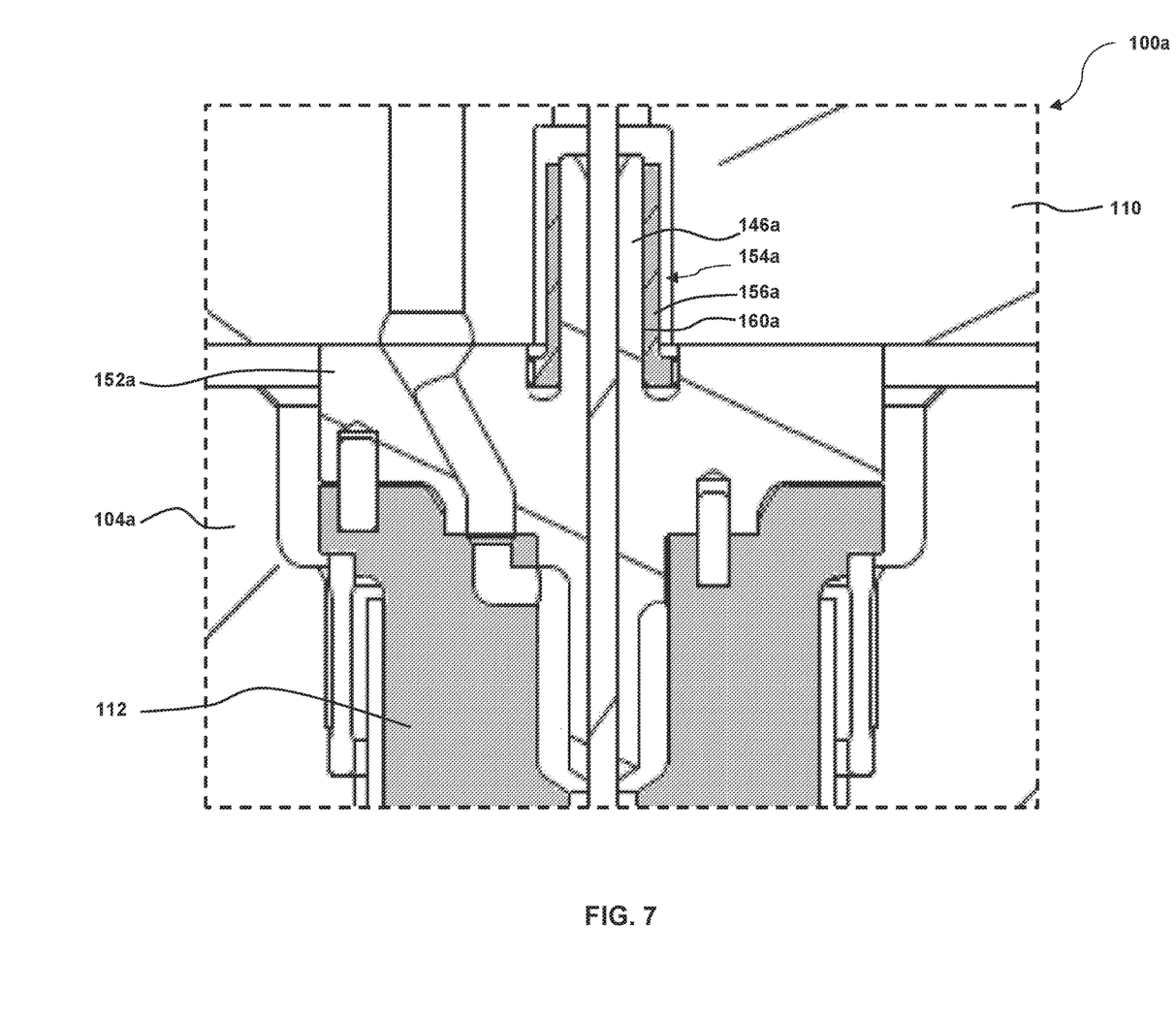
FIG. 7 is a sectional view of the upstream end of the nozzle and thermal bridge of FIG. 6, taken along line 7-7 and shown installed in a portion of an injection molding system which is similar to portion 3 of FIG. 1.
Figure 8:
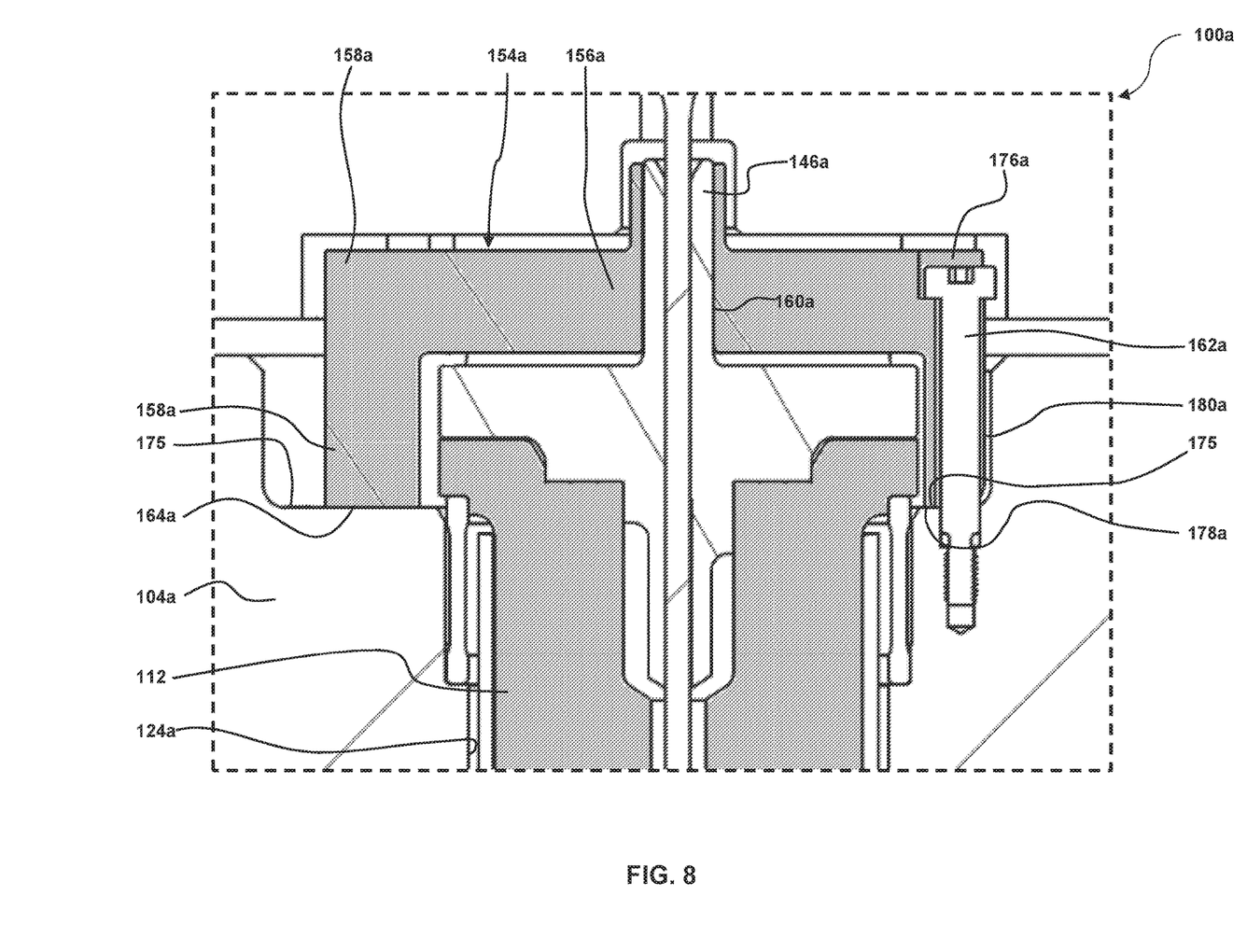
FIG. 8 is a sectional view of the upstream end of the nozzle and thermal bridge of FIG. 6, taken along line 8-8 and shown installed in a portion of an injection molding system which is similar to portion 4 of FIG. 2.

Referring now to FIG. 6, FIG. 7, and FIG. 8, in which FIG. 6 is a perspective view of the upstream end of nozzle 112 and a thermal bridge 154a in accordance with another embodiment of the present disclosure in which thermal bridge 154a is in conductive thermal communication with second mold plate 104a at two locations. Features and aspects of the current embodiment may be used with the other embodiments disclosed herein. FIG. 7 is a sectional view of the upstream end of nozzle 112 and thermal bridge 154a taken along line 7-7 of FIG. 6 and shown installed in a portion of an injection molding apparatus 100a which is similar to portion 3 of FIG. 1, and FIG. 8 is a sectional view of the upstream end of nozzle 112 and thermal bridge 154a taken along line 8-8 of FIG. 6 and shown installed in a portion of injection molding apparatus 100a which is similar to portion 4 of FIG. 2. Thermal bridge 154a includes a proximal portion 156a in conductive thermal communication with valve pin seal 146a and a first distal portion 158a that is spaced apart from proximal portion 156a and in conductive thermal communication with second mold plate 104a. A proximal heat transfer interface 160a is defined between valve pin seal 146a and proximal portion 156a, and a first distal heat transfer interface 164a is defined between first distal portion 158a and second mold plate 104a. Thermal bridge 154a is seated against second mold plate 104a at first distal portion 158a, for example, against a step 175 in well 124a, as is shown in FIG. 8, and is secured in place by, for example a fastener such as a shoulder bolt (not shown). In the current embodiment valve pin seal 146a is a portion of a bushing component 152a that is located at the upstream end of nozzle 112.

Referring to FIGS. 6 and 8, thermal bridge 154A includes a second distal portion 176a that is spaced apart from proximal portion 156a and from first distal portion 158a. Second distal portion 176a is in conductive thermal communication with second mold plate 104a. A second distal heat transfer interface 178a is defined between second distal portion 176a of thermal bridge 154a and second mold plate 104a. Thermal bridge 154a is seated against second mold plate 104a at second distal portion 176a, for example, against step 175 in well 124, and is secured in place by, for example a fastener 162a, such as a shoulder bolt. In an embodiment of the present disclosure, the surface area of first distal heat transfer interface 164a is different than the surface area of second distal heat transfer interface 178a. For example, as shown in FIG. 8, the surface area of first distal heat transfer interface 164a is greater than the surface area of second heat transfer interface 178a.

Referring to FIG. 6, first distal portion 158a and second distal portion 176 includes respective base portions, i.e. first base portion 168a and a second base portion 180a through which thermal bridge 154a is in conductive thermal communication with second mold plate 104a. As can be seen in FIG. 6, base portion 168a of first distal portion 158a partially surrounds the upstream end of nozzle 112 which increases the surface area of first distal heat transfer interface 164a. In an embodiment of the present disclosure (not shown) first base portion 168a surrounds nozzle 112 and is in conductive thermal communication with second distal portion 176a. Such a configuration increases the surface area of a heat transfer interface between thermal bridge 154a and second mold plate 104a.

Figure 9:
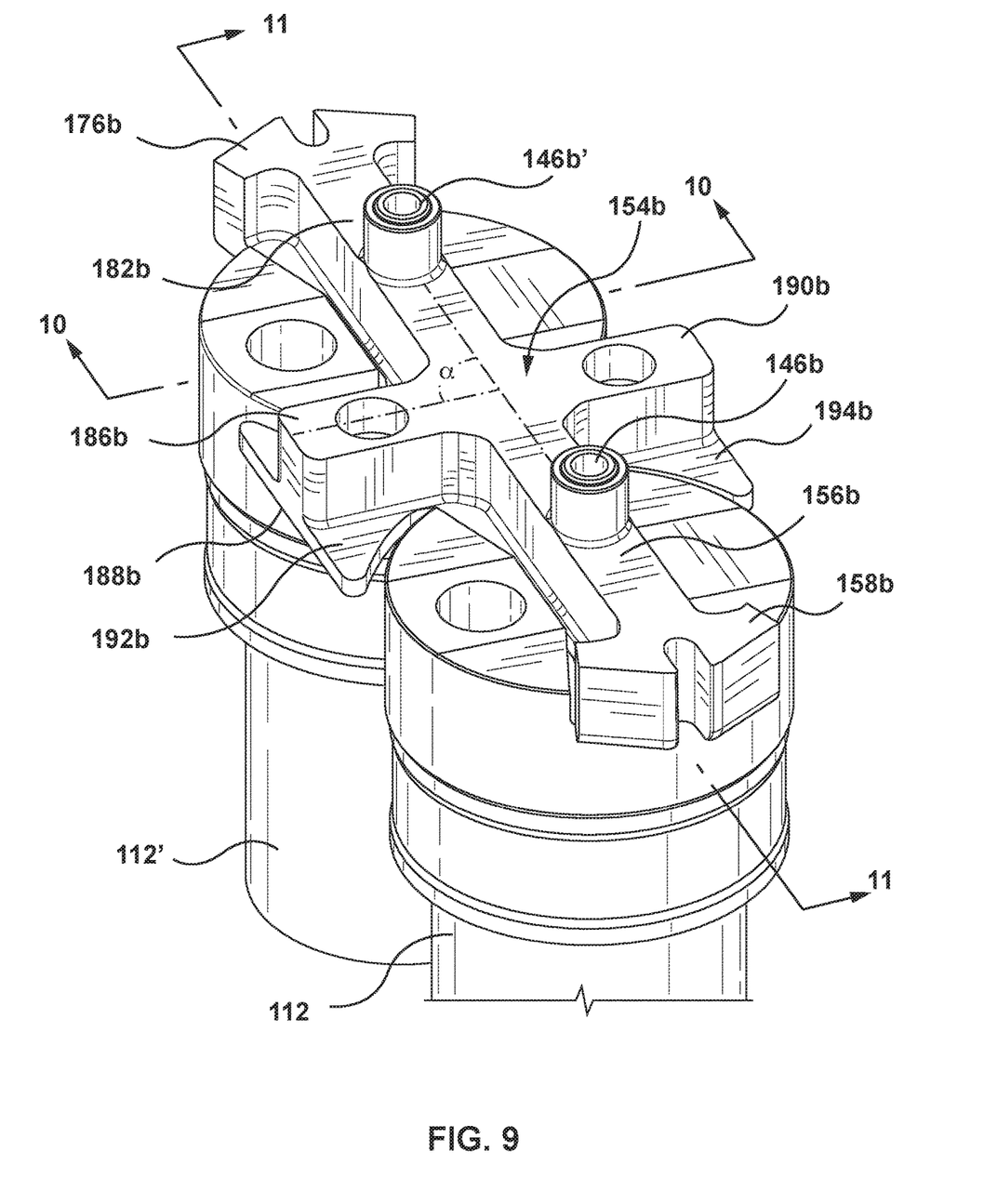
FIG. 9 is a perspective view of the upstream end of a nozzle and a thermal bridge in accordance with yet another embodiment of the present disclosure.
Figure 10:
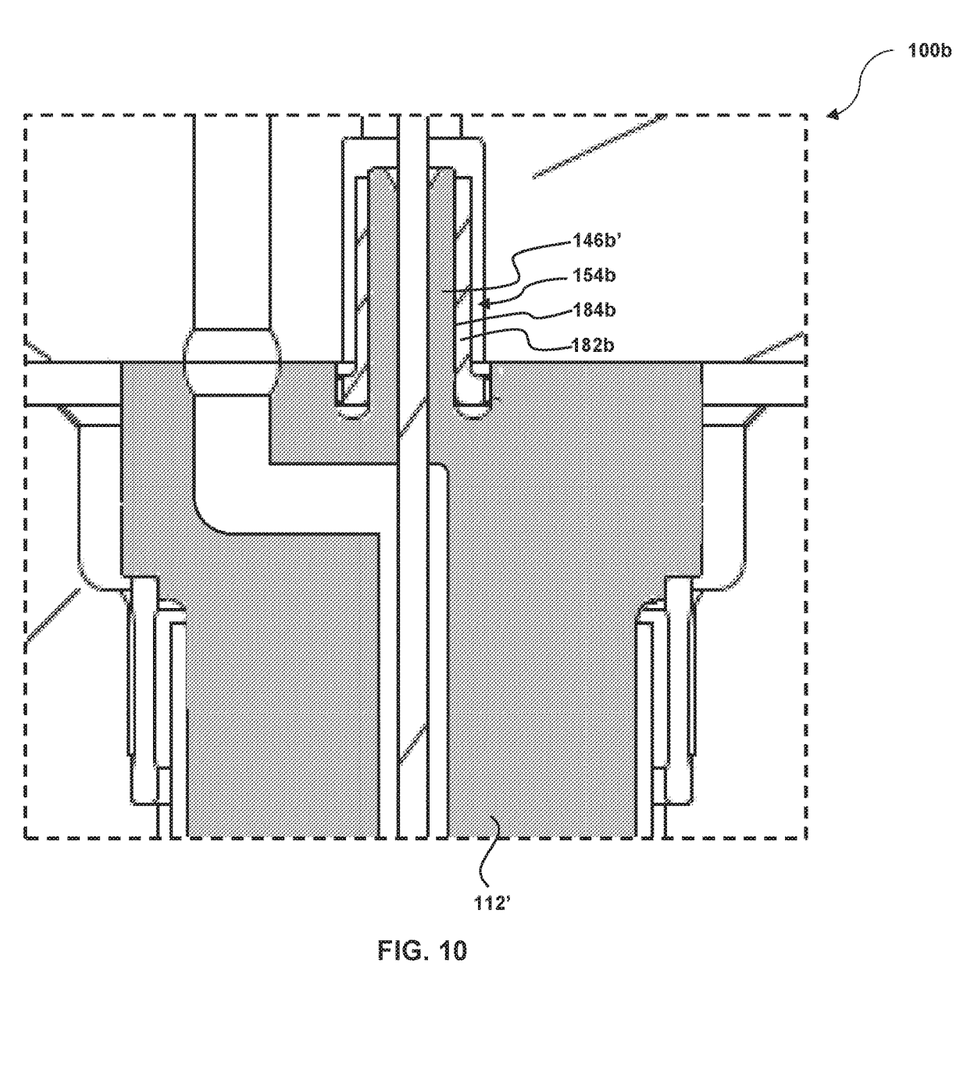
FIG. 10 is a sectional view of the upstream end of the nozzle and thermal bridge of FIG. 9, taken along line 10-10 and shown installed in a portion of an injection molding system which is similar to portion 3 of FIG. 1.
Figure 11:
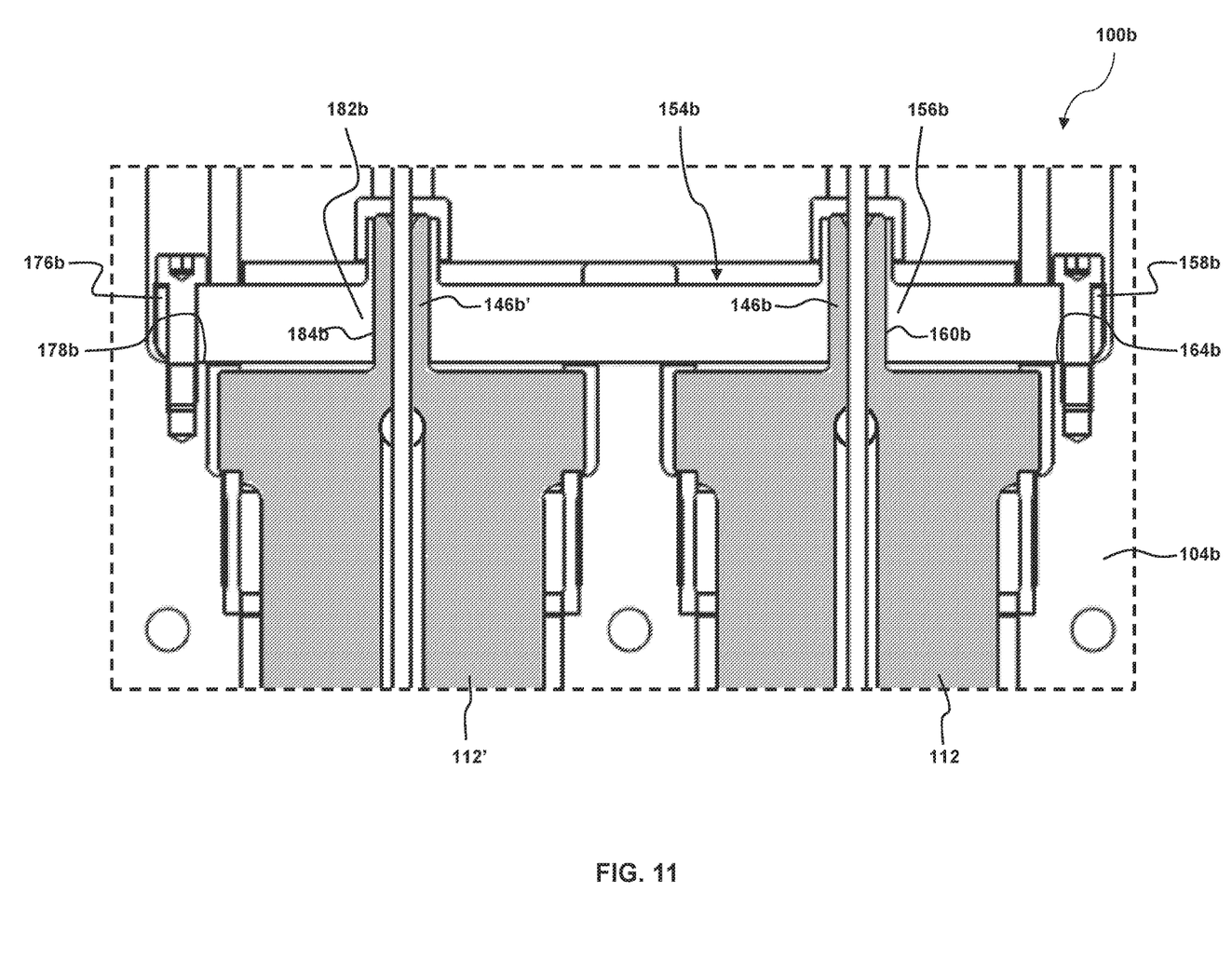
FIG. 11 is a sectional view of the upstream end of the nozzle and thermal bridge of FIG. 9, taken along line 11-11 and shown installed in a portion of an injection molding system which is similar to portion 4 of FIG. 2.

Referring now to FIG. 9, FIG. 10, and FIG. 11, in which FIG. 9 is a perspective view of the upstream end of a first nozzle 112, a second nozzle 112' and a thermal bridge 154b in accordance with another embodiment of the present disclosure in which thermal bridge 154b is in conductive thermal communication with two valve pin seals 146b, 146b', each associated with a respective nozzle 112, 112', and is in conductive thermal communication with second mold plate 104b. Features and aspects of the current embodiment may be used with the other embodiments disclosed herein. FIG. 10 is a sectional view of a portion of an injection molding apparatus 100b (similar to portion 3 of FIG. 1) taken along line 10-10 of FIG. 9, and FIG. 11 is a sectional view of a portion of injection molding apparatus 100b (similar to portion 4 of FIG. 2) taken along line 11-11 of FIG. 9. Second nozzle 112' is like first nozzle 112. An upstream end of first nozzle 112 and an upstream end of second nozzle 112' include respective valve pin seals 146b, 146b'. In the current embodiment valve pin seals 146b, 146b' are unitary portions of respective nozzles 112, 112'. Thermal bridge 154b is in conductive thermal communication with valve pin seals 146b, 146b' of first and second nozzles 112, 112' and with second mold plate 104b as shown in FIG. 11. Thermal bridge 154b includes a first proximal portion 156b, a second proximal portion 182b laterally spaced apart from first proximal portion 156b, and a first distal portion 158b spaced apart from first proximal portion 156b and second proximal portion 182b. As shown in FIG. 9 by way of example, first distal portion 158b first proximal portion 156b, and second proximal portion 182b are in line with each other. Referring to FIG. 11, first proximal portion 156b is in conductive thermal communication with valve pin seal 146. A first proximal heat transfer interface 160b is defined between valve pin seal 146b and first proximal portion 156b. Second proximal portion 182b is in conductive thermal communication with valve pin seal 146b'. A second proximal heat transfer interface 184b is defined between valve pin seal 146b' and second proximal portion 182b. First distal portion 158b is in conductive thermal communication with second mold plate 104b; a first distal heat transfer interface 164b, laterally adjacent to nozzle 112, is formed between first distal portion 158b and second mold plate 104b.

Continuing with FIGS. 9 and 11, thermal bridge 154b includes a second distal portion 176b in conductive thermal communication with second mold plate 104b. A second distal heat transfer interface 178b, laterally adjacent to nozzle 112' is formed between second distal portion 176b and second mold plate 104b. As shown in FIG. 9 by way of example second distal portion 176b is in line with first distal portion 158b, first proximal portion 156b, and second proximal portion 182b. Second distal portion 176b forming second distal heat transfer interface 178b with second mold plate 104b is optional and can be omitted if not needed.

Referring to FIG. 9, thermal bridge 154b optionally includes a transverse portion 186b that projects at an angle α from thermal bridge 154b. By way of example transverse portion 186b projects from thermal bridge 154b midway between first proximal portion 156b and second proximal portion 182b. Also, by way of example, the angle α at which transverse portion 186b projects from thermal bridge 154b is 90 degrees. Transverse portion 186b is in conductive thermal communication with second mold plate 104b. A first transverse heat transfer interface (not shown) is formed between the bottom of transverse portion 186b as shown in the page view of FIG. 9 at location 188b and second mold plate 104b. Transverse portion 186b crosses thermal bridge 154b to create a second transverse portion 190b which is in conductive thermal communication with second mold plate 104b to create a second transverse heat transfer interface (not shown) between second transverse portion 190b and second mold plate 104b. Second transverse portion 190b and second transverse heat transfer interface are optional and can be omitted if not needed. As shown in FIG. 9, first and second transverse portions 186b, 190b optionally include first and second transverse base portions 192b, 194b.

While various embodiments have been described above, they are presented only as illustrations and examples, and not by way of limitation. Thus, the present invention should not be limited by any of the above-described embodiments but should be defined only in accordance with the appended claims and their equivalents.

What is claimed is:

1. A hot runner system comprising:
    a manifold having a manifold channel for receiving material from a source, and the manifold channel extending between a manifold inlet and a manifold outlet;
    a cooled mold plate;
    a nozzle for delivering molding material to a mold cavity, the nozzle having a nozzle channel in fluid communication between the manifold channel and the mold cavity, and a valve pin seal at an upstream end of the nozzle;
    a valve pin slidably received in the valve pin seal, the valve pin extending through the manifold and the nozzle;
    an actuator connected to the valve pin for translating the valve pin between an open position and a closed position; and
    a thermal bridge in conductive thermal communication with the valve pin seal and the cooled mold plate, wherein:
    the thermal bridge includes a proximal portion in conductive thermal communication with the valve pin seal and a distal portion that is spaced apart from the proximal portion and is in conductive thermal communication with the cooled mold plate,
    the thermal bridge includes another distal portion, the another distal portion is spaced apart from the proximal portion and is spaced apart from the distal portion, and
    a surface area of a heat transfer interface between the distal portion and the cooled mold plate is different than the surface area of another heat transfer interface between the another distal portion and the cooled mold plate.

2. The hot runner system of claim 1, wherein the thermal bridge longitudinally overlaps the valve pin seal.

3. The hot runner system of claim 2, wherein the valve pin seal is disposed between the valve pin and the thermal bridge.

4. The hot runner system of claim 1, wherein the distal portion includes a base portion in conductive thermal communication with the cooled mold plate.

5. The hot runner system of claim 4, wherein the base portion at least partially surrounds the upstream end of the nozzle.

6. The hot runner system of claim 1, wherein the valve pin seal is a tubular shaped structure in which the valve pin is slidably received.

7. The hot runner system of claim 6, wherein the thermal bridge at least partially surrounds the valve pin seal.

8. The hot runner system of claim 6, wherein the valve pin seal projects rearwardly beyond the upstream end of the nozzle and into a valve pin passageway in the manifold.

9. The hot runner system of claim 8, wherein the thermal bridge includes a sleeve in which the valve pin seal is received.

10. The hot runner system of claim 1, wherein the another distal portion includes another base portion in conductive thermal communication with the cooled mold plate.

11. The hot runner system of claim 1 further comprising:
    another nozzle having another valve pin seal at an upstream end thereof, and wherein the thermal bridge includes a proximal portion in conductive thermal communication with the valve pin seal,
    another proximal portion in conductive thermal communication with the another valve pin seal, and
    a distal portion in conductive thermal communication with the cooled mold plate.

12. The hot runner system of claim 1, wherein a surface area of a first conductive heat transfer area between the thermal bridge and the cooled mold plate is greater than a surface area of a second conductive heat transfer area between the thermal bridge and the valve pin seal.

13. The hot runner system of claim 1, wherein the thermal bridge is made from a material that is more thermally conductive than a material from which the valve pin seal is made.

14. An injection molding apparatus comprising:
a plurality of mold plates that define an enclosure;
the hot runner system of claim 1, wherein the hot runner system is received in the enclosure
wherein the nozzle is received in a well in one of the plurality of mold plates.

15. A hot runner system comprising:
a manifold having a manifold channel for receiving material from a source, and the manifold channel extending between a manifold inlet and a manifold outlet;
a cooled mold plate;
a nozzle for delivering molding material to a mold cavity, the nozzle having a nozzle channel in fluid communication between the manifold channel and the mold cavity, and a valve pin seal at an upstream end of the nozzle;
a valve pin slidably received in the valve pin seal, the valve pin extending through the manifold and the nozzle;
an actuator connected to the valve pin for translating the valve pin between an open position and a closed position;
a thermal bridge in conductive thermal communication with the valve pin seal and the cooled mold plate,
another nozzle having another valve pin seal at an upstream end thereof, and wherein the thermal bridge includes a proximal portion in conductive thermal communication with the valve pin seal, another proximal portion in conductive thermal communication with the another valve pin seal, and
a distal portion in conductive thermal communication with the cooled mold plate,
wherein the distal portion is in conductive thermal communication with the cooled mold plate at a heat transfer interface adjacent to the nozzle, and wherein the thermal bridge includes another distal portion in conductive thermal communication with the cooled mold plate at another heat transfer interface adjacent to the another nozzle.

16. The hot runner system of claim 15 further comprising:
a transverse portion that projects at an angle from the thermal bridge and is in conductive thermal communication with the cooled mold plate.

17. A hot runner system comprising:
a manifold having a manifold channel for receiving material from a source, and the manifold channel extending between a manifold inlet and a manifold outlet;
a cooled mold plate;
a nozzle for delivering molding material to a mold cavity, the nozzle having a nozzle channel in fluid communication between the manifold channel and the mold cavity, and a valve pin seal at an upstream end of the nozzle;
a valve pin slidably received in the valve pin seal, the valve pin extending through the manifold and the nozzle;
an actuator connected to the valve pin for translating the valve pin between an open position and a closed position; and
a thermal bridge in conductive thermal communication with the valve pin seal and the cooled mold plate, wherein the manifold and the nozzle define a walled passageway through which the thermal bridge extends, and wherein the walled passageway is spaced apart from the thermal bridge.

\* \* \* \* \*